(12) United States Patent
Peele

(10) Patent No.: US 6,898,431 B1
(45) Date of Patent: May 24, 2005

(54) DYNAMIC CHANNEL ALLOCATION IN A SECTORED CELL OF A CELLULAR COMMUNICATION SYSTEM

(75) Inventor: James Calvin Peele, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/317,480

(22) Filed: May 24, 1999

(51) Int. Cl.[7] ............................. H04Q 7/20; H04B 1/38; H04M 1/00

(52) U.S. Cl. ................... 455/453; 455/450; 455/452.1; 455/452.2; 455/562.1

(58) Field of Search ............................... 455/452, 450, 455/446, 562, 453, 33.2, 33.1, 422, 423, 447, 509, 561; 379/60

(56) References Cited

U.S. PATENT DOCUMENTS

| | | | | |
|---|---|---|---|---|
| 5,111,534 A | * | 5/1992 | Benner | 455/33.2 |
| 5,247,699 A | * | 9/1993 | Hartman | 455/33.1 |
| 5,276,907 A | * | 1/1994 | Meidan | 455/436 |
| 5,586,170 A | * | 12/1996 | Lea | 379/60 |
| 5,649,293 A | * | 7/1997 | Reed | 455/453 |
| 5,809,423 A | * | 9/1998 | Benveniste | 455/452 |
| 5,861,844 A | * | 1/1999 | Gilmore et al. | 342/374 |
| 5,960,351 A | * | 9/1999 | Przelomiec | 455/450 |
| 6,047,186 A | * | 4/2000 | Yu et al. | 455/446 |
| 6,119,011 A | * | 9/2000 | Borst et al. | 455/452 |
| 6,161,024 A | * | 12/2000 | Komara | 455/562 |
| 6,236,866 B1 | * | 5/2001 | Meyer et al. | 455/562 |

* cited by examiner

*Primary Examiner*—Lee Nguyen
*Assistant Examiner*—Raymond B. Persino
(74) *Attorney, Agent, or Firm*—Coats & Bennett, P.L.L.C.

(57) ABSTRACT

In a sectored cell of a cellular communication network, channels are dynamically reassigned from a first sector in the cell to a second sector in the same cell when the loading in the first sector reaches a predetermined threshold. The channels allocated to the cell are further subdivided into subgroups and assigned initially to respective sectors in the cell. During normal operation, the channels in each sector are allocated to users in that sector in the usual manner. When the number of channels allocated in a first sector of the cell reaches a predetermined threshold, the base station controller polls the remaining sectors for unused channels. If an unused channel is found, that channel may be reassigned to the first sector. In one embodiment, the base station controller polls the controller in the nearest co-channel cells before reassigning the channel to prevent co-channel interference.

21 Claims, 7 Drawing Sheets

DYNAMIC CHANNEL ALLOCATION IN A SECTORED CELL OF A CELLULAR COMMUNICATION SYSTEM

FIELD OF THE INVENTION

The present invention relates generally to methods for allocating channels in a cellular communication system and, more particularly, to a method for dynamically allocating channels within a sectored array base station.

BACKGROUND OF THE INVENTION

In a cellular communication system, the coverage area is divided into a plurality of cells. Each cell is served by a base station that communicates with mobile stations within that cell. The base stations are connected to a Mobile Services Switching Center (MSC) which, in turn, is connected to the Public Switched Telephone Network (PSTN). The MSC switches calls to allow mobile users to communicate with other mobile users or to telephones connected to the PSTN.

Cellular communication systems are designed to handle a very large number of mobile users with a limited number of available frequencies. To accommodate the large number of users, the available frequencies are subdivided into frequency groups. Typically, one frequency group is assigned to each cell in the network. The frequency groups are assigned such that adjacent cells do not use the same frequency group. Cells to which the same frequency group has been assigned are called "co-channel cells."

It is common practice to utilize sectored cells to reduce interference between co-channel cells. For example, a cell may be subdivided into three 120° sectors. The frequency group assigned to a particular cell is then further subdivided into subgroups which are assigned to respective sectors in each cell. In the past, the channel allocations to sectors in a cell are fixed. That is, each sector within the cell is assigned a fixed number of channels. One consequence of the fixed allocation scheme is that it reduces the spectral efficiency of the cellular network when one sector is fully loaded and another sector within the same cell has free channels. In a cellular system without sectorized cells, the base station would simply assign the next available channel. However, in the case of the sectorized cell, there would be no available channels to assign in the fully-loaded sector, even though there are unused channels in the same cell.

SUMMARY OF THE INVENTION

The present invention is a method for dynamically allocating channels within a sectored cell of a cellular communication network. The coverage area is divided into a plurality of continuous cells. The available channels are assigned in groups to particular cells. The cells within the network are further subdivided into sectors. The channels assigned to a particular cell are divided into subgroups and the subgroups are assigned to respective sectors. If, for example, there are three sectors in a cell, the channels assigned to that cell are divided into three subgroups and assigned to respective sectors.

A controller located at a base station within the cell monitors the use of channels within each sector of the cell. If utilization of the channels in a particular sector exceeds some predetermined threshold, the controller polls other sectors within the cell for unused channels. If unused channels are found, the controller dynamically reassigns the unused channels in one sector to meet demand in the fully-loaded sector. By dynamically reassigning channels between sectors, a gain in spectral efficiency is realized as compared to sectorized cells in the prior art cellular networks.

The re-allocation of channels within the cell could be accomplished in several different ways. One method would be to equip each sector with a transmitter and receiver for every channel allocated to the cell. The unused transmitters and receivers would be operated in a stand-by mode until needed. A second method would utilize RF relays for each transmitter output and receiver input. Channels could be routed to the appropriate sector under the direction of the controller. A third method would utilize a small number of frequency agile transmitters and receivers in each sector.

In another aspect of the invention, the base station controller could be programmed to poll the base station controllers in the nearest co-channel cells before reassigning unused channels from one sector to another. If a sector is fully loaded, the controller would first poll other sectors for unused channels. If unused channels are found, the controller would then poll controllers in the nearest co-channel cells to determine if reassignment of any or all of the unused channels would cause co-channel interference. If not, then the controller would be free to dynamically reassign the channels within the cell to meet demand in the fully loaded sector.

DETAILED DESCRIPTION OF THE INVENTION

Figure 1:
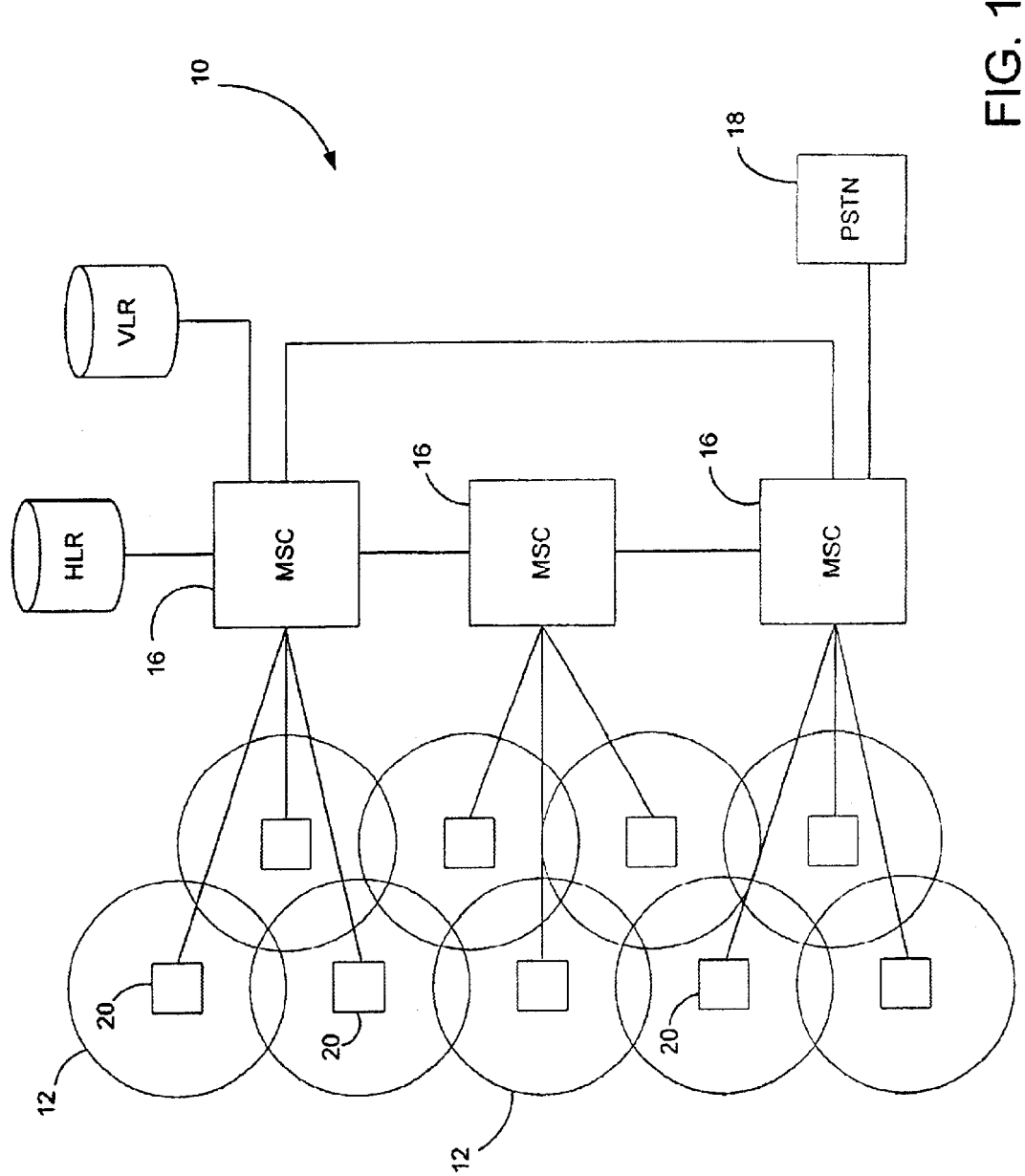
FIG. 1 is a schematic diagram illustrating a typical cell plan for a cellular communication network using a seven cell reuse pattern.

The invention is a dynamic channel allocation scheme for a cellular communication network. FIG. 1 is a schematic diagram of a cellular communication system indicated generally by the numeral 10. The cellular communication system comprises a plurality of contiguous cells 12 that provide radio coverage throughout the network. Each cell 12 is served by a base station 20 that provides radio coverage to mobile phones within that particular cell. The base stations 20 are connected to a Mobile Services Switching Center (MSC) 16. Typically, a cellular network will include many MSCs 16. The function of the MSCs 16 is to connect calls which either originate or terminate within the cellular communication system. At least one MSC 16 in the network is connected via a gateway to the Public Switched Telephone Network (PSTN) 18. This allows users of the cellular communication system 10 to place calls to and receive calls from persons connected to the PSTN 18.

Figure 2:
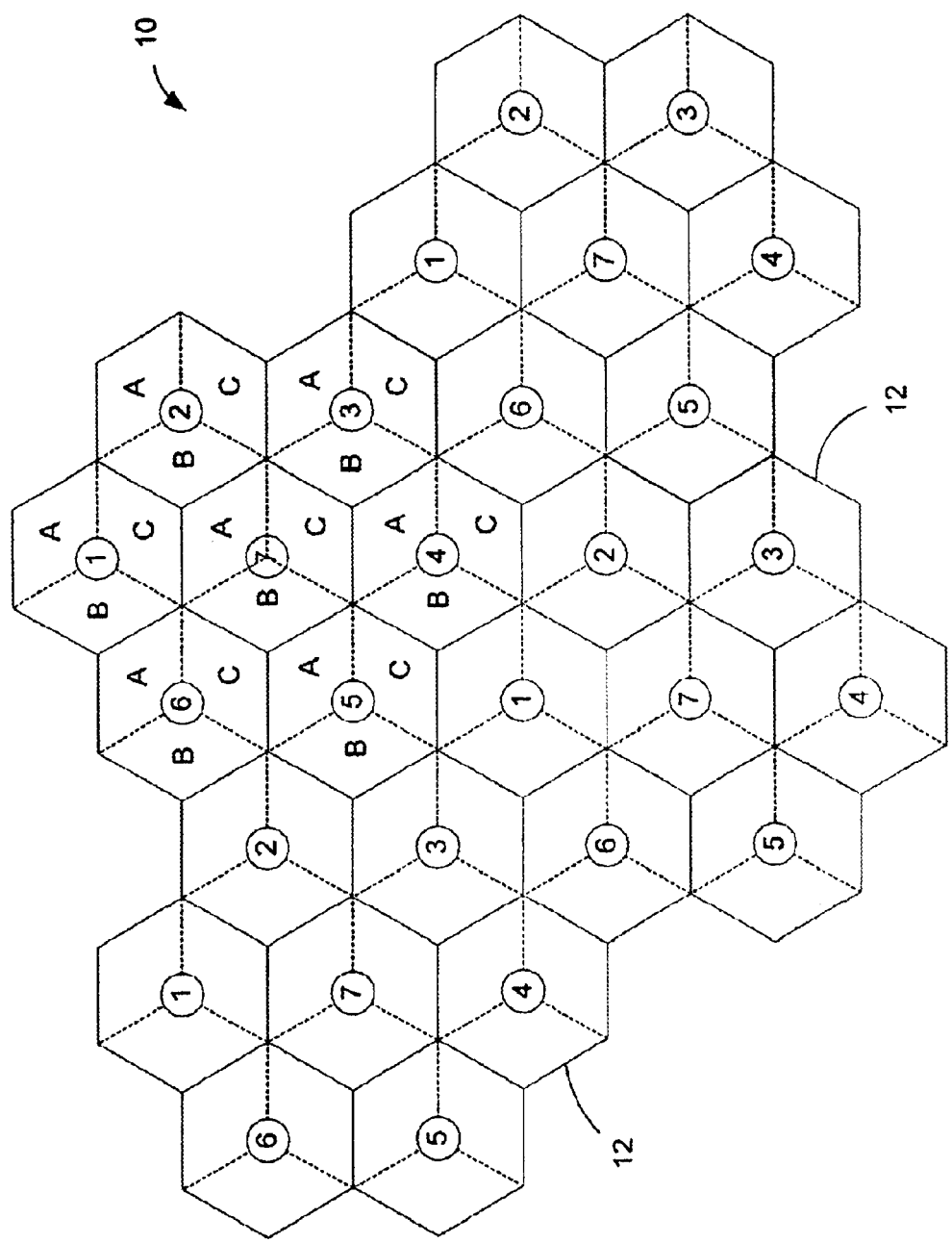
FIG. 2 is a flow diagram illustrating the dynamic channel allocation method according to the present invention.

Within the cellular communication network, the available frequencies or channels used for communication are subdivided into a plurality of frequency groups. FIG. 2 shows a typical frequency plan for a cellular communication system 10. The frequency groups are assigned to the cells of the network so that each frequency group can be reused a number of times. In FIG. 2, the frequency groups are denominated by the numbers 1 through 7. Each frequency group is assigned to multiple cells. The reuse of frequencies in different cells is one of the fundamental concepts of a cellular communication system. The frequencies are allocated in such a way that adjacent cells do not use the same frequency group. Cells that are assigned the same frequency group are referred to as co-channel cells.

In the United States, cellular systems commonly employ a four-cell reuse pattern and a seven-cell reuse pattern. Other reuse patterns are also known. In a cellular system employing a four-cell reuse pattern, each frequency group is used in one of every four cells. In a cellular system employing a seven-cell reuse pattern, there are seven frequency groups, each of which is used in one of every seven cells. The disclosed embodiment was a seven cell reuse pattern. The present invention is not, however limited to systems using a seven cell reuse pattern. In fact, the invention can be used in any cellular system regardless of the reuse frequency. Typically, the cells are arranged into clusters, with each cluster including one cell from each frequency group.

One way of reducing co-channel interference is to use sectorized cells. In a conventional cellular communication system, the base station 20 is equipped with an omni-directional antenna and is typically located in the center of the cell 12. Radio signals are transmitted from the base station 20 in all directions. The cellular system of the present invention uses a sectorized network wherein each cell is further subdivided into sectors. In the disclosed embodiment, the cells of the network are divided into three 120° sectors, as shown in FIG. 2, although any number of sectors could be used. The sectors shall be denominated by the letters A, B, and C. Each base station 20 includes three directional antennas, each broadcasting radio signals into its designated sector. The frequencies assigned to the cells of the network are further subdivided into subgroups that are assigned to respective sectors of the cell. An advantage of using sectors in a cellular communication network is that the sectors reduce interference among co-channel cells, thereby allowing this reuse distance to be reduced.

In a conventional cellular communication system that uses sectored cells, the frequencies or channels allocated to each sector are fixed. If one sector is fully loaded and another sector in the same cell has unused channels available for allocation, those unused channels cannot be used in the fully-loaded sector. The present invention uses a dynamic channel allocation method to reassign channels from one sector in a cell to another sector of the same cell. Thus, when one sector within a cell reaches a predetermined threshold and there are unused channels in another sector of the same cell, the unused channel can be re-allocated to the fully-loaded sector.

Figure 3:
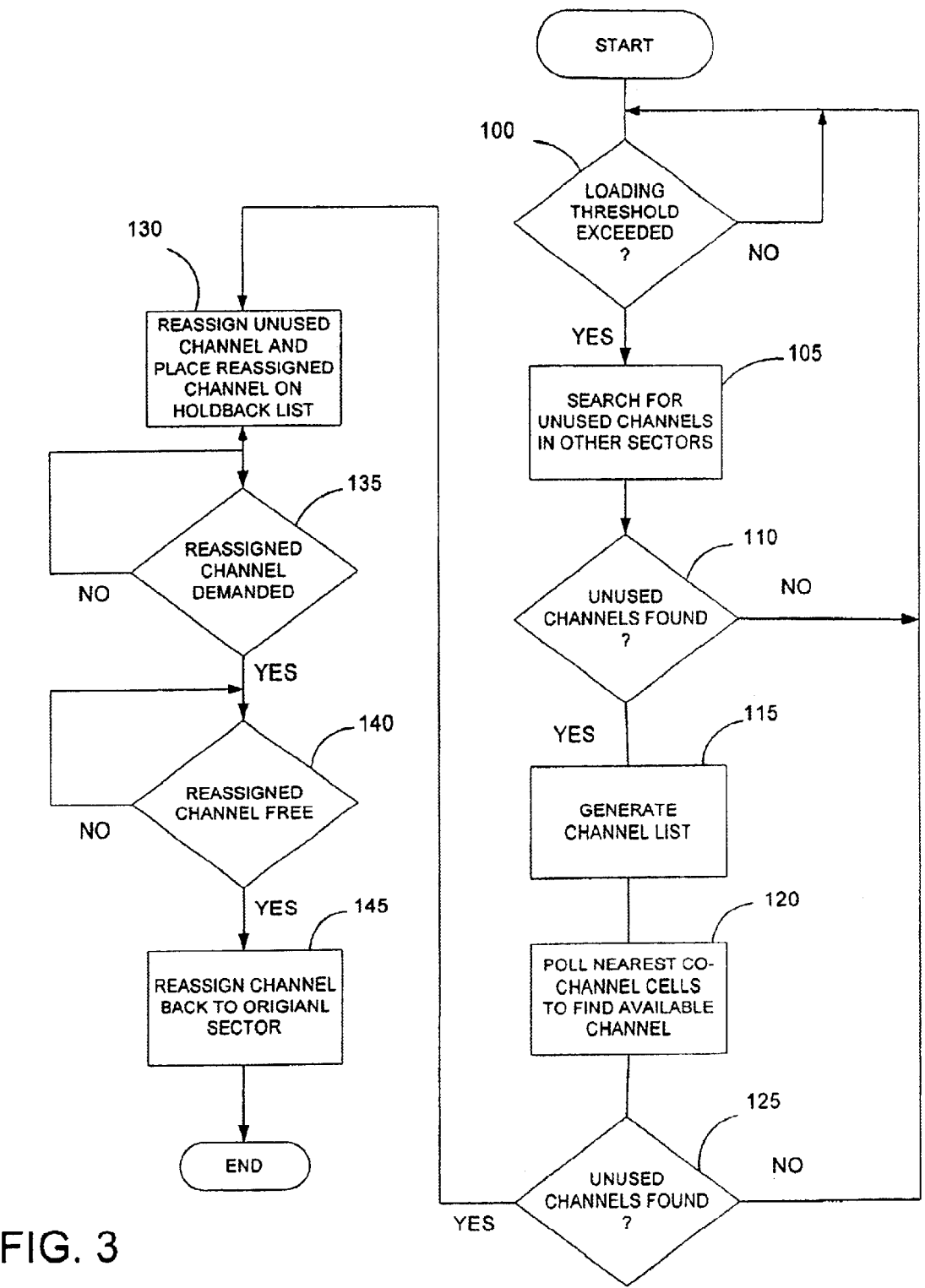
FIG. 3 is a block diagram of a base station that uses the redundant array approach for dynamic channel allocation.

FIG. 3 is a flow diagram illustrating the dynamic channel allocation method of the present invention. The base station controller monitors channel utilization in each of the sectors. In block 100, the base station controller determines whether the current channel usage in a sector exceeds a predetermined loading factor or threshold. If the channel utilization in the sector is less than the predetermined threshold, the base station controller does not take any action. However, if the channel utilization exceeds the threshold, then the base station controller searches for unused channels in the remaining sectors (block 105). If there are no unused channels in the remaining sectors (block 110), then the base station controller takes no action. If unused channels are found, the base station controller generates a list of the unused channels (block 115). The base station controller then polls the base station controller in the nearest co-channel cells to determine if any of the channels in the channel list are being used in the co-channel cells (block 120). A channel that is being used in the co-channel cell is considered unavailable. If there are no available channels, then the base station controller takes no action. If an available channel is found (block 125), the base station controller reassigns the available unused channel to the fully-loaded sector (block 130) and places the channel on a hold-back list in the co-channel cells. The channels on the hold-back list will be allocated last in the co-channel cells to minimize the potential for co-channel interference.

After a channel has been reassigned, the same channel may be demanded in a co-channel cell to prevent the load in the co-channel cell from exceeding a second predetermined threshold, which may be the same as the first predetermined threshold. When the reassigned channel is demanded in one of the co-channel cells (block 135), the base station controller will determine whether the reassigned channel is in use (block 140). If the channel is in use, the base station controller waits until the channel is free. Once the reassigned channel is free, the base station controller reassigns the channel back to its original sector and removes the channel from the hold-back list in the co-channel cells (block 145).

There are many ways to configure the base station 20 for dynamic channel allocation. FIGS. 3–7 illustrate three different ways in which dynamic channel allocation can be accomplished. The various methods for dynamic channel allocation are referred to herein as the redundant array method, the switching method, and the frequency agility method. These examples are by no means exhaustive. Those skilled in the art will recognize many different ways to accomplish the same results.

Figure 4:
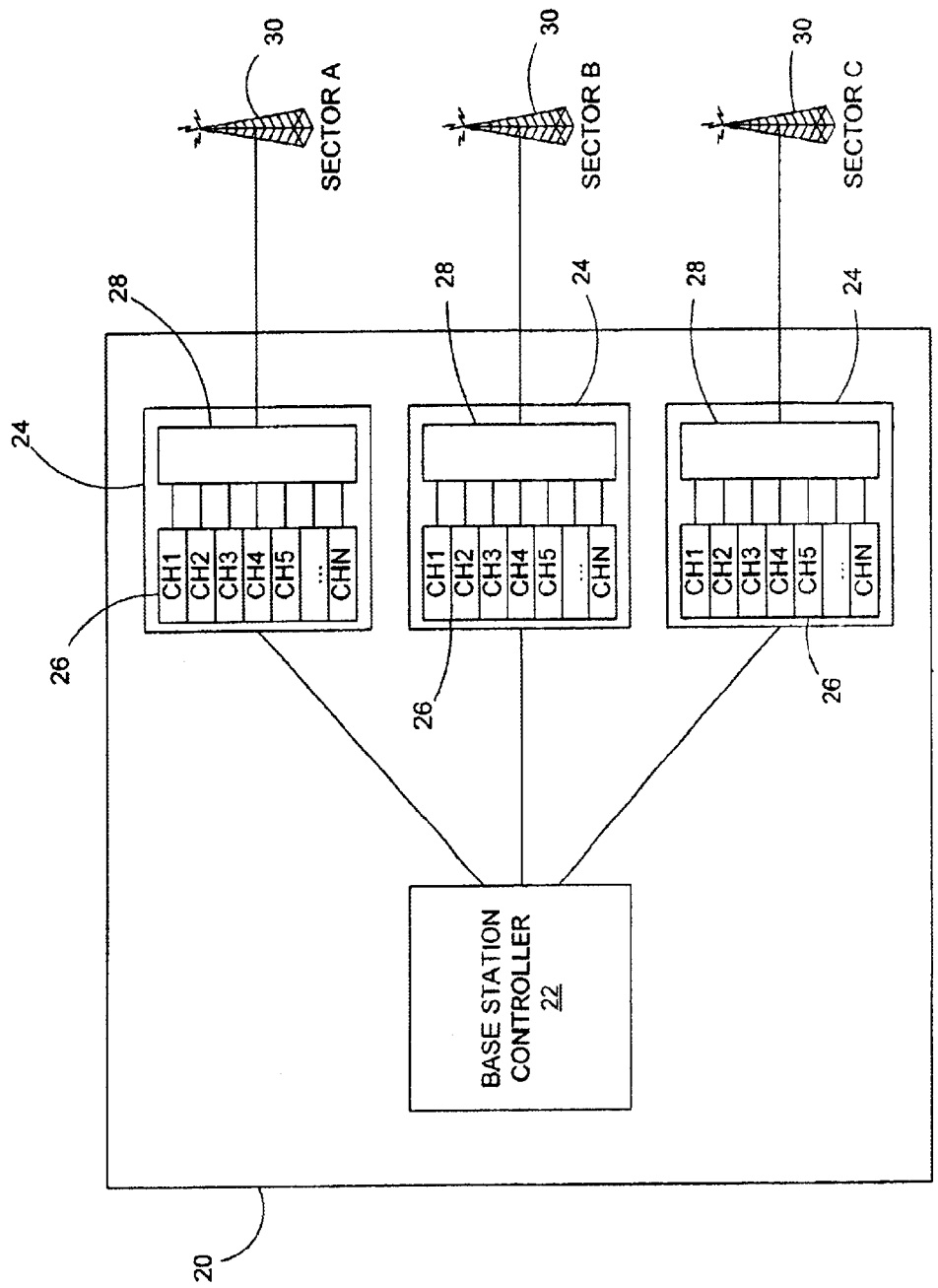
FIG. 4 is a block diagram showing an alternate embodiment of the base station that uses the switching approach for dynamic channel allocation.

Referring now to FIG. 4, a block diagram of a base station 20 that implements the redundant array method of dynamic allocation is shown. The base station 20 includes a base station controller 22 and three transceiver arrays 24, each of which is connected to a directional antenna 28 by a signal combiner/splitter. Each transceiver array 24 includes a plurality of transmitters and receivers, indicated collectively by the numeral 26, for each channel allocated to the cell. The channels allocated to the cell are subdivided into three subgroups. The subgroups are assigned to respective sectors in the cell. The transceivers 26 in each transceiver array 24 for the channels allocated to the corresponding sector are referred to herein as the primary transceivers or primary channels in that array. The remaining transceivers in each array are referred to as the redundant transceivers.

In operation, the primary transceivers (those corresponding to channels allocated to a particular sector) would be active and the redundant transceivers would be operated in stand-by mode until needed. The base station controller 22 monitors the use of channels in each sector. If the utilization of channels in one sector exceeded some predetermined value, the controller 22 would then poll other sectors within the cell for unused channels. If unused channels are found, the controller would re-allocate an unused channel in another sector to the fully-loaded sector. The redundant transceiver for the reassigned channel in the fully loaded sector would be activated. The corresponding transceiver in the sector from which the channel was borrowed would be placed in standby mode by the base station controller 22.

For example, assume that a cell has three sectors denominated as sectors A, B, and C. Twelve channels are allocated to the cell with the sector A being allocated channels 1–4, sector B being allocated channels 5–8, and sector C being allocated channels 9–12. In this scenario, assume that sector B becomes fully loaded while sectors A and C would have unused channels. The base station controller 22 would poll sectors A and C to determine which channels are available. After determining the available channels, the base station controller 22 would poll the base stations 20 in the nearest co-channel cells to determine if any of the available channels are in use in the co-channel cell. If the channel is not being used in the co-channel cell so that allocation of the channel would not create co-channel interference, then the base station controller 22 would allocate the channel to the fully-loaded sector. In the example given above, assume that channel 4 in sector A is available. The base station controller 22 would poll the co-channel cells to determine whether channel 4 is in use in the co-channel cells. If channel 4 is not being used in the co-channel cells, then channel 4 could be reassigned from sector A to sector B. In that case, the transceiver 26 corresponding to channel 4 in sector A would be placed in stand-by mode and the corresponding redundant transceiver 26 in sector B would be activated.

In the base station shown in FIG. 4, the transceiver array 24 in each sector includes a transceiver 26 for every channel allocated to a particular cell. Using this method, only one-third of the total transceivers 26 will be active at any given time. In other words, two-thirds of the transceivers 26 are redundant. This high level of redundancy makes this method of approach allocation expensive to implement. One way to reduce the expense would be to make each transceiver array 24 less than fully redundant. That is, each sector could use a partially redundant array. For example, if each sector is initially allocated 4 channels, then that sector would include 4 primary channels and 4 redundant channels. Of the 4 redundant channels, 2 would be borrowed from each of the other two sectors.

Using a partially redundant allocation scheme, the base station controller 22 would attempt to allocate channels in such a way that there would be unused channels available for each of the other sectors until that sector became fully loaded. For example, assume that sector A is allocated channels 1–4. Channels 1 and 2 are allocated as redundant channels to sector B. Channels 3 and 4 are allocated as redundant channels to sector C. When allocating a new channel, the base station controller 22 would attempt to equalize the number of channels from each grouping of redundant channels. For example, the first channel allocated would be selected from channels 1 and 2, the second channel allocated would be selected from channels 3 and 4, and so forth until all the channels are allocated.

The partially redundant transceiver arrays would reduce the cost of the base station equipment as compared to the fully redundant array. However, since the number of redundant channels is less than a fully redundant array, the likelihood of finding an available channel is reduced.

Figure 5:
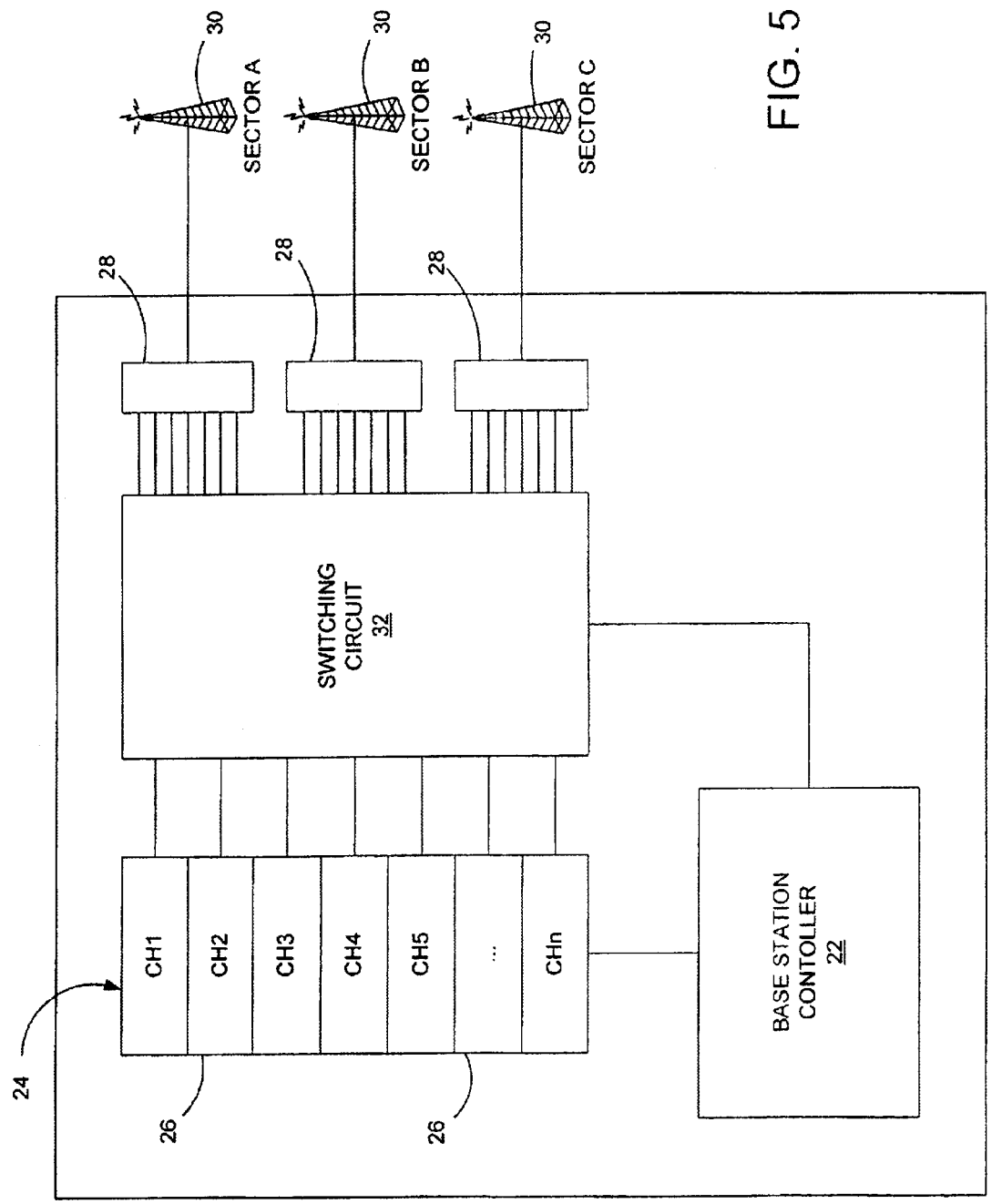
FIG. 5 is a block diagram illustrating a portion of the switching circuit shown in FIG. 4.
Figure 6:
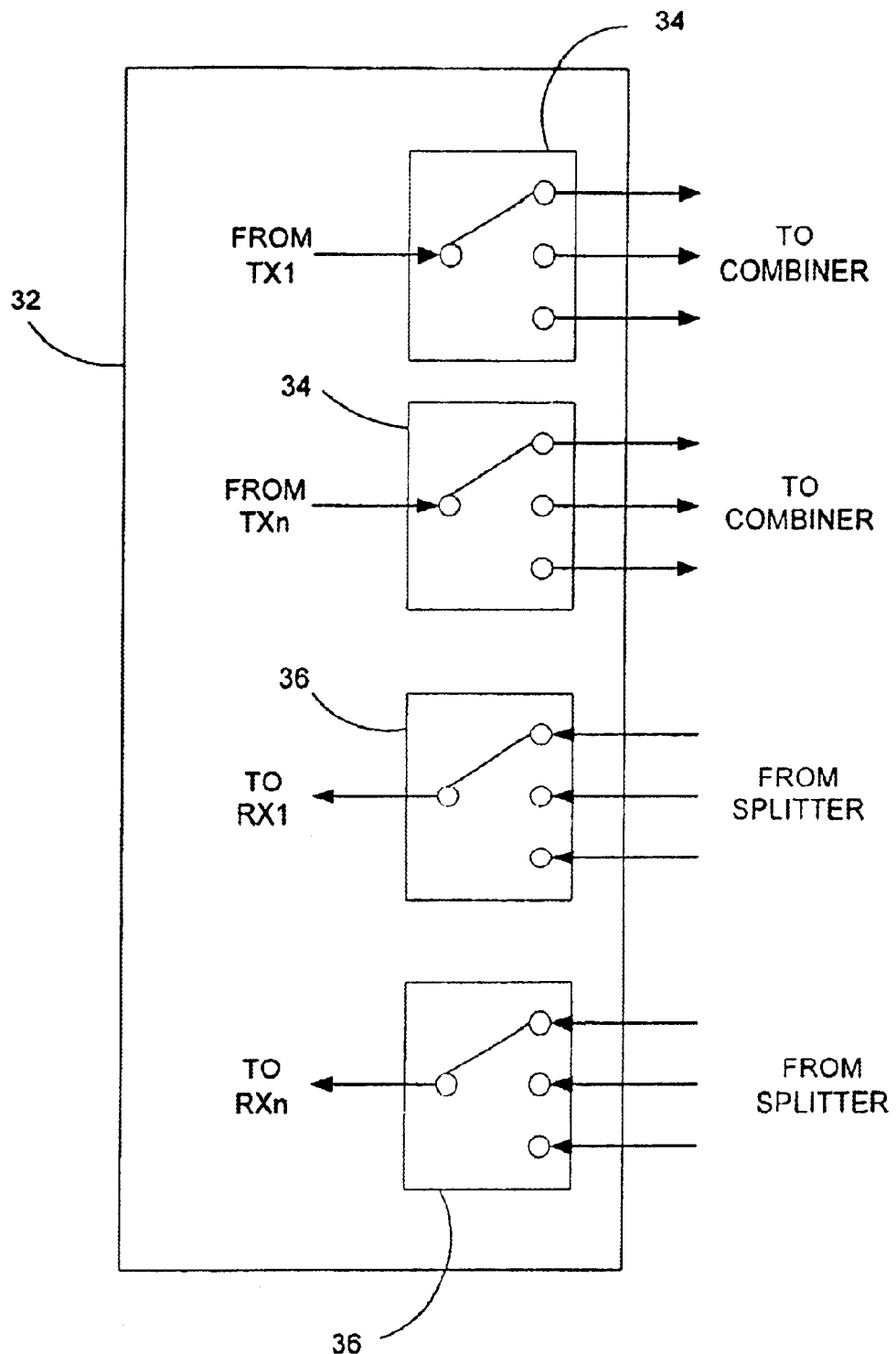
FIG. 6 is a block diagram showing an alternate embodiment of the base station that uses the frequency agility approach for dynamic channel allocation.

FIG. 5 illustrates an alternative base station 20 that uses the switching approach for dynamically allocating channels. The base station in FIG. 5 includes a single transceiver array 24 connected by a switching circuit 32 to each antenna 30. The switching circuit 32 is shown in greater detail in FIG. 6. As seen in FIG. 6, the switching circuit 32 comprises a plurality of radio frequency relays 34, 36 for each transmitter output and receiver input. Each transmitter relay 34 would have one input and n output ports. Each receiver relay 36 would have n inputs and one output ports. The relays 34, 36 would be operated under the direction of the base station controller 22 to switch the transmitter outputs and receiver inputs to the appropriate antenna 30. This approach to dynamic allocation would be less expensive to implement than the redundant array approach. However, the size of the combiners and splitters 28 in each sector would have to be increased to accommodate the increased number of inputs. This would increase the wiring complexity at the base station.

Figure 7:
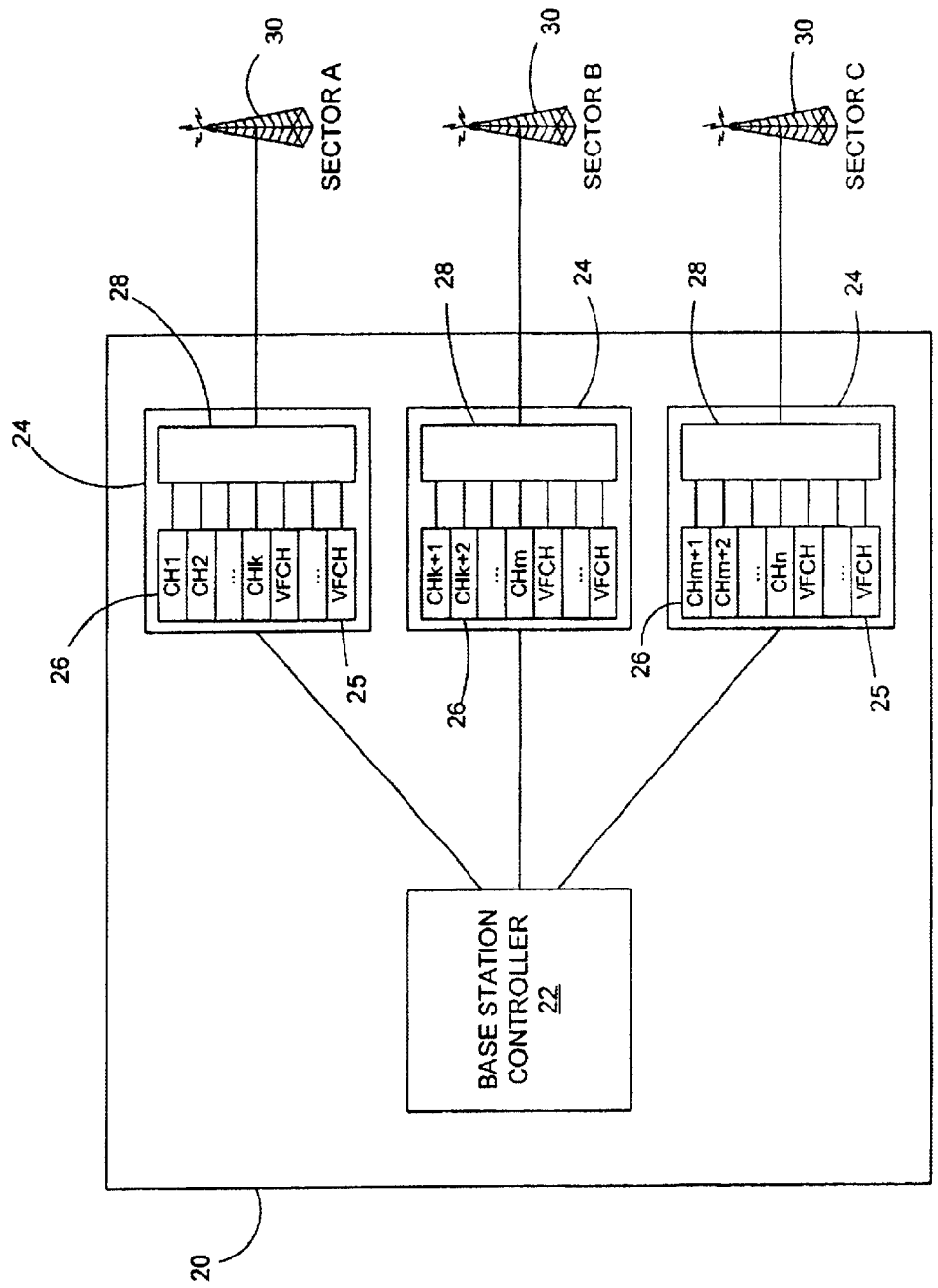

FIG. 7 shows a third embodiment of the base station 20 that uses the frequency agility approach to dynamic channel allocation. This approach is similar to the redundant array approach in that it includes three separate transceiver arrays 24 corresponding to each of the sectors in the cell. Each transceiver array 24 is operated under the control of the base station controller 22. Each transceiver array 24 would include a number of fixed frequency transceivers 26 corresponding to the channels allocated to that particular sector. In addition to the fixed frequency transceivers, each transceiver array 24 would include one or more frequency agile transceivers 25. The frequency agile transceivers 25 in this embodiment would serve the same function as the redundant transceivers in the redundant array method. During normal conditions, the frequency agile transceivers 25 would be operated in stand-by mode. When a sector became fully loaded, the base station controller 22 would look for an available channel in the other sectors to re-allocate to the fully-loaded sector. If a suitable channel is found, the base station controller 22 would program one of the frequency agile transceivers 25 in the fully-loaded sector to operate on the re-allocated channel and place the frequency agile transceiver 25 into service. One advantage of this method is that it would greatly reduce the number of transceivers as compared to the redundant array approach. Further, the frequency agility approach for dynamic allocation would simplify the wiring, as compared to the switching approach. Another advantage of using the frequency agility approach is that the frequency agile transceivers 25 can be used as a back-up for the fixed transceivers 24 within a sector. In the event that one of the transceivers fails, an unused frequency agile transceiver 25 could be used to replace the failed unit until repairs can be made.

The examples given above illustrate several possible variations of the dynamic allocation method of the present invention. The description of these representative embodiments should not be construed as limiting the invention. All that is required is that the base station implement some method by which channels allocated to one sector can be dynamically re-allocated to another sector within the same cell.

What is claimed is:

1. A method for allocating channels in a sectored cell of a cellular communication system having a plurality of cells comprising:
   a. dividing the cell into a plurality of sectors;
   b. subdividing channels allocated to the cell into frequency subgroups;
   c. providing a transceiver array for each sector, wherein each said transceiver array includes a plurality of primary transceivers for channels allocated to the corresponding sector and one or more redundant transceivers for channels allocated to other sectors of the cell;
   d. placing the primary transceivers in each sector in active mode while said redundant transceivers are placed in a standby mode;
   e. allocating channels in each sector to users in that sector;
   f. determining the loading of each sector of the cell;
   g. when the loading in a first sector reaches a predetermined threshold, reassigning an unused channel from a second sector to the first sector;
   h. placing the primary transceiver in the second cell corresponding to the reassigned channel in a standby mode; and i. placing the redundant transceiver in the first sector corresponding to the reassigned channel in a an active mode.

2. The method of claim 1 further including the step of further reassigning the reassigned channel back to its original sector when the channel is demanded in the original sector.

3. The method according to claim 1 further including the step of determining whether the unused channel in the second cell is in use in another co-channel cell in the network before the unused channel is reassigned to the first sector.

4. The method of claim 3 further including the step of placing the reassigned channel on a hold back list in the co-channel cell designating channels that should be among the last to be allocated.

5. The method of claim 4 further including the step of reassigning the reassigned channel back to its original sector when the channel is demanded in the co-channel cell.

6. The method according to claim 1 wherein said redundant transceiver is a frequency agile transceiver and further including the step of programming the redundant transceiver to operate on the reassigned channel.

7. A base station for a sectored cell in a cellular communication system comprising:
   a. a plurality of antennas for broadcasting and receiving signals in respective sectors of the cell;
   b. a transceiver array for each sector operatively connected to the antenna for that sector, each transceiver array including a plurality of primary transceivers for broadcasting and receiving signals on the channels that are allocated to the corresponding sector, and at least one redundant transceiver for transmitting and receiving signals on communication channels allocated to another sector in the cell;
   c. a base station controller operatively connected to each transceiver array for monitoring channel utilization in each cell and for reassigning a channel from a first sector in a cell to a second sector in the same cell when the loading in the first sector reaches a predetermined threshold.

8. The base station of claim 7 further wherein the base station controller reassigns the channel by placing the primary transceiver in the first sector corresponding to the reassigned channel in a standby mode and placing a redundant transceiver in the second sector in an active mode.

9. The base station of claim 7 further including determining means for determining whether the unused channel in the first sector is in use in another co-channel cell in the network before the unused channel is reassigned to the second sector.

10. The base station of claim 9 further including means for placing the reassigned channel on a hold back list in the co-channel cell designating channels that should be among the last to be allocated in the co-channel cell.

11. The base station of claim 7 further including means reassigning the reassigned channel back to its original sector when the channel is demanded in the co-channel cell.

12. A method for allocating channels in a sectored cell of a cellular communication system having a plurality of cells comprising:
   a. subdividing the channels allocated to the cell into frequency subgroups;
   b. assigning the frequency subgroups to respective sectors in the cell;
   c. providing a single transceiver array having a plurality of transceivers corresponding to the channels allocated to the cell;
   d. connecting the transceivers corresponding to each frequency subgroup to an antenna in the sector of the cell to which the subgroup has been assigned;
   e. allocating channels in each sector to users in that sector;
   f. determining the loading of each sector of the cell;
   g. when the loading in a first sector reaches a predetermined threshold, reassigning an unused channel from a second sector to the first sector;
   h. disconnecting the transceiver corresponding to the reassigned channel from the second sector and connecting it to said first sector.

13. The method according to claim 12 wherein the step of connecting and disconnecting the transceiver is accomplished by means of a switch.

14. The method of claim 12 further including the step of further reassigning the reassigned channel back to its original sector when the channel is demanded in the original sector.

15. The method according to claim 12 further including the step of determining whether the unused channel in the second sector is in use in another co-channel cell in the network before the unused channel is reassigned to the first sector.

16. The method of claim 15 further including the step of placing the reassigned channel on a hold back list in the co-channel cell designating channels that should be among the last to be allocated.

17. The method of claim 16 further including the step of reassigning the reassigned channel back to its original sector when the channel is demanded in the co-channel cell.

18. A base station for a sectored cell in a cellular communication system comprising:
   a. a plurality of antennas for broadcasting and receiving signals in respective sectors of the cell;
   b. a transceiver array including a plurality of transceivers for broadcasting and receiving signals on the channels allocated to the cell;
   c. a switching circuit connecting the transceiver array to the antenna in each sector of the cell for switching the transceiver inputs and outputs to respective antennas;
   d. a base station controller operatively connected to the transceiver array and switching circuit for:
      i) monitoring channel utilization in each sector of the cell, and determining the loading in each sector;
      ii) reassigning a channel from a first sector in a cell to a second sector in the same cell when the loading in the first sector reaches a predetermined threshold; and
      iii) switching the transceiver corresponding to the reassigned channel from the second sector to the first sector.

19. The base station of claim 18 further including determining means for determining whether the unused channel in the first sector is in use in another co-channel cell in the network before the unused channel is reassigned to the second sector.

20. The base station of claim 19 further including means for placing the reassigned channel on a hold back list in the co-channel cell designating channels that should be among the last to be allocated in the co-channel cell.

21. The base station of claim 18 further including means reassigning the reassigned channel back to its original sector when the channel is demanded in the co-channel cell.

* * * * *